Feb. 20, 1951  E. E. EATON  2,542,911
TRANSMISSION
Filed Feb. 7, 1947  3 Sheets-Sheet 1

INVENTOR.
Ernest E. Eaton
BY Walter E. Shirmer
Att'ys.

Feb. 20, 1951 E. E. EATON 2,542,911
TRANSMISSION
Filed Feb. 7, 1947 3 Sheets-Sheet 3

Inventor
Ernest E. Eaton
By Walter E. Schirmer
Atty.

Patented Feb. 20, 1951

2,542,911

UNITED STATES PATENT OFFICE 2,542,911

TRANSMISSION

Ernest E. Eaton, Berrien Springs, Mich., assignor to Clark Equipment Company, Buchanan, Mich., a corporation of Michigan Application February 7, 1947, Serial No. 727,123

2 Claims. (Cl. 74—375)

This invention relates to transmissions, and more particularly is directed to a transmission for industrial trucks and similar vehicles where it is desired that several speed ratios be provided through the transmission in either direction of drive.

The present invention contemplates providing a transmission having a low and high speed drive which can be used either for forward or reverse drive of the truck, since in vehicles of this type, the truck is driven both forwardly and rearwardly in the handling of materials within a manufacturing plant or in the handling of goods at a warehouse or on docks or other shipping points.

The present transmission has as one of its primary objects to provide a construction in which selection of the direction of drive and selection of the speed of drive can be made independently so that the vehicle may be driven either forwardly or rearwardly in either low or high speed ratio at the will of the operator.

Another feature of the present invention is a design of transmission in which a simplified gearing arrangement is provided which is simple in design, easy to assemble, and economical in cost.

Another feature of the present invention is to provide a sliding clutch member on the shaft driven from the clutch gear which will control the selection of the speed ratio in which the transmission is to be driven, with the output shaft of the transmission located below the shaft which is coupled to the clutch gear and having a second sliding clutch which selects either forward or reverse drive through the output shaft. The location of the output shaft provides for a lowered axis of the connection between the output shaft and the driving axle, which is desirable in vehicles of this type in which spacial requirements for other mechanism associated with the vehicle such as the hydraulic systems and the like require that all space within the chassis of the vehicle be utilized to the utmost.

Other objects and advantages of the present invention will appear more fully from the following detailed description which, taken in conjunction with the accompanying drawings, will disclose to those skilled in the art, the particular construction and operation of a preferred form of the present invention.

Figure 1:
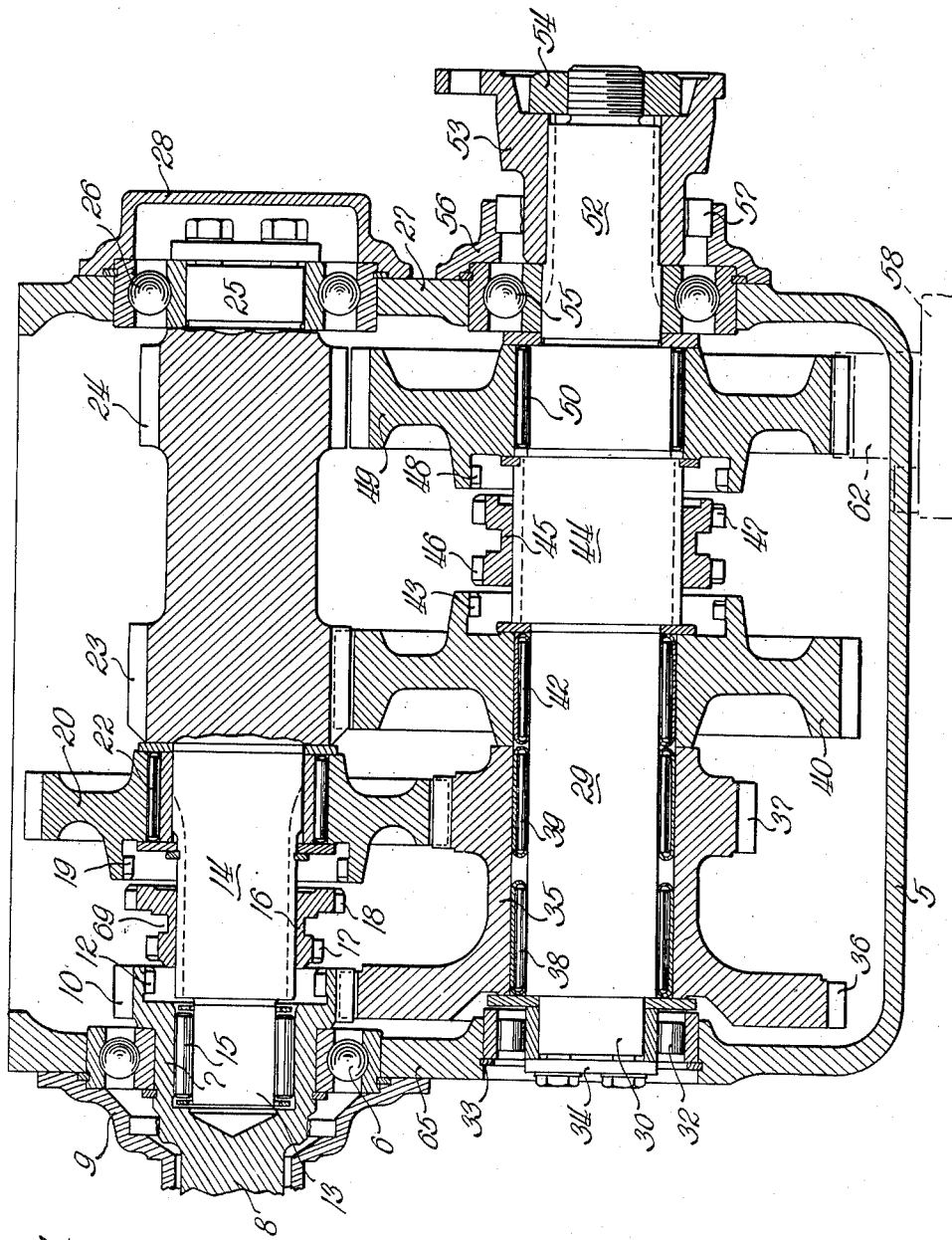
Figure 1 is a sectional view through a transmission embodying the present invention.

Referring now in detail to the drawings, the transmission housing is indicated generally at 5, and is provided in its forward wall with an opening within which is mounted the ball bearing assembly 6 which supports the enlarged end portion 7 of a drive shaft 8 connected to the driven elements of a clutch (not shown), the clutch being mounted within a suitable cap member 9 bolted to the forward wall of the transmission and forming a retainer for the outer race of the bearing assembly 6.

The end of the clutch shaft 8 is enlarged to form a pinion gear 10, which pinion gear is provided with internal clutch teeth 12 in a recessed portion in the end of the shaft 8, this recessed portion also providing an opening within which is disposed a reduced end portion 13 of the shaft 14, this end portion 13 being journalled within the opening by means of the roller bearings 15.

The shaft 14 is splined adjacent the end 13 thereof, and upon this splined portion there is mounted for axial sliding movement a clutch member 16. The clutch member 16 is provided with a forward clutch portion 17 adapted to engage with the clutch teeth 12 when it is desired to clutch the gear 8 directly to the shaft 14, and when moved in an opposite direction has clutch teeth 18 adapted to have clutch engagement with the internal clutch teeth 19 of a gear member 20 rotatably journalled upon the shaft 14 as by means of the needle rollers 22.

The gear 20 is mounted between suitable thrust washers for holding it against endwise movement, and the shaft 14 beyond the gear 20 is enlarged to provide integral gear portions 23 and 24.

The end of the shaft opposite the reduced portion 13 is reduced as indicated at 25, and is journalled within suitable bearings 26 for support in the rear end wall 27 of the transmission housing, the shaft being enclosed by the bearing retaining closure cap 28.

Disposed below the shaft 14 and in substantial vertical alinement therewith, there is provided the output shaft 29, which shaft has one end thereof indicated at 30 mounted in the radial bearing assembly 32 held in position within the opening in the forward wall of the housing 5 by means of the snap ring 33 and a suitable flange member 34 bolted into the forward end of the shaft 29.

Mounted upon the shaft 29 is a compound gear member, indicated generally at 35, having the gear portion 36 meshing with the drive gear portion 10 of the shaft 8 and having a gear portion 37 in meshing engagement with the rotatable gear 20. The compound gear member 35 is rotatably journalled upon the shaft 29 by means of the self-contained needle bearing assemblies 38 and 39 adjacent opposite ends of the hub portion of this gear.

Also rotatably journalled upon the shaft 29 is a drive gear member 40 which is supported upon the needle bearing assembly 42 and is provided with an overhanging internal clutch tooth portion 43 extending over the splined portion 44 of the shaft 29.

Mounted upon this splined portion of the shaft 29 is a sliding clutch member 45 having clutch teeth portions 46 adapted when member 45 is shifted to the left to mesh with the internal clutch teeth 43 of the gear 40 to thereby clutch this gear to the shaft 29.

Corresponding clutch tooth portions 47 of the clutch member 45 are adapted to mesh with the internal clutch portion 48 of a gear member 49 when the clutch member 45 is shifted to the right, as viewed in Figure 1.

The gear 49 is rotatably journalled upon a reduced portion of the shaft 29 by means of the bearings 50, and the shaft 29 is provided with a reduced extension 52 upon which is splined the companion flange 53 of a universal joint assembly, this flange being held in position by means of the nut 54 threaded onto the end of the shaft and also serving to hold the inner race of the bearing assembly 55 in position about the shaft. The bearing assembly 55 is journalled about the end of the shaft 29 in the rear end wall 27 of the housing, and is suitably enclosed by the bearing cap member 45, there being a suitable lubricant seal member 57 interposed between the bearing cap and hub portion of the companion flange 53.

Mounted in a laterally offset position with respect to the shaft 14 and above the axis of the shaft 29 there is provided a stub shaft, indicated diagrammatically in Figure 1 at 58, which shaft is fixed in position by means of the lock member 59 bolted by means of the bolt 60 through the end wall of the transmission housing.

Mounted for rotation about the stub shaft 58 is an idler gear, indicated diagrammatically at 62, which has constant meshing engagement between the gear portion 24 of shaft 14 and the gear 49 which is journalled on the shaft 29.

In the operation of the mechanism as thus far described, it will be apparent that when the clutch member 16 is shifted to the left the drive shaft 8 will be directly coupled to the shaft 14 and through the shaft 14 will drive the gear 23 which in turn drives the gear member 40 on the main shaft or output shaft 29. With the clutch member 45 shifted also to the left, a forward drive in high speed will be provided through this clutching arrangement. With the gear member 45 shifted to the right, however, the shaft 14 drives gear 24 formed integrally therewith, and this in turn through idler gear 62 drives the gear 49 which is clutched by the member 45 to the shaft 44, thereby providing high speed reverse drive to the output shaft.

Also, with the clutch member 16 shifted to the right, as viewed in Figure 1, there will be a low speed drive provided from clutch shaft 8 to gear 10 and thence through compound gear 36—37 to gear 20 which gear 20 is clutched to the shaft 14. This drives the shaft 14 at a reduced speed relative to the speed of the drive shaft 8, and in turn either forward or reverse drive can be effected to the output shaft 29 as determined by the shifted position of the clutch member 45.

For controlling the operation of the transmission, there is provided on the bell housing 64, which bell housing is mounted on the forward wall 65 of the transmission housing 5 and which encloses the clutch mechanism by which the shaft 8 is driven, dual control towers 66 and 67.

The control tower 66 is provided with a gear shift lever 68 which is adapted to be operatively connected to a shifter fork engaging in the groove or annular collar 69 of the clutch member 16 whereby rocking of the shift lever 68 will produce selective engagement of the clutch 16 in either the gear 10 or the gear 20.

The other control tower 67 has a shift lever 70 mounted therein which is operatively connected to a shifter fork controlling the movement of the clutch member 45. When the shifter fork 70 is selectively moved from one position to the other it will move the shifter fork 45 to provide either forward or reverse drive or to return the clutch member to neutral position, as shown in Figure 1. Thus it will be apparent that the operator can control the operation of this transmission by providing through one shift lever a selection of either low or high speed drive and providing by selection through the other shift lever either forward or reverse drive in either one of the preselected gear ratios.

Thus, it is possible for the operator to shift directly from high speed forward drive to high speed reverse drive, or from low speed forward drive to low speed reverse drive, or by selective shifting by both of the control levers 68 and 70 to provide for shifting from low speed forward drive to high speed reverse drive, or from high speed forward drive to low speed reverse drive. Thus, there are numerous combinations of drives in either direction which the operator may select through the control mechanism provided by the shift levers 68 and 70.

Figure 2:
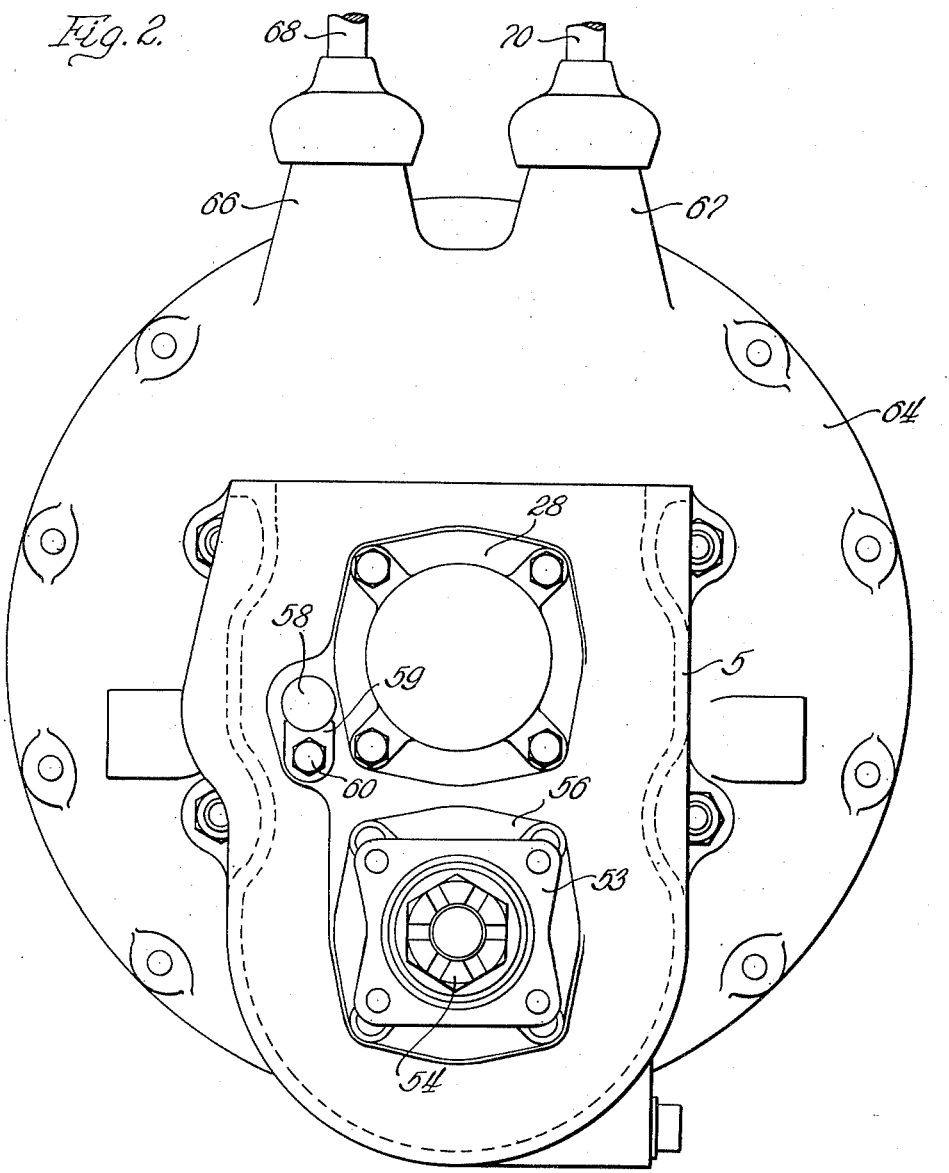
Figure 2 is an end elevational view of the transmission illustrating the control mechanism and the manner in which the output shaft projects from the rear of the transmission housing.
Figure 3:
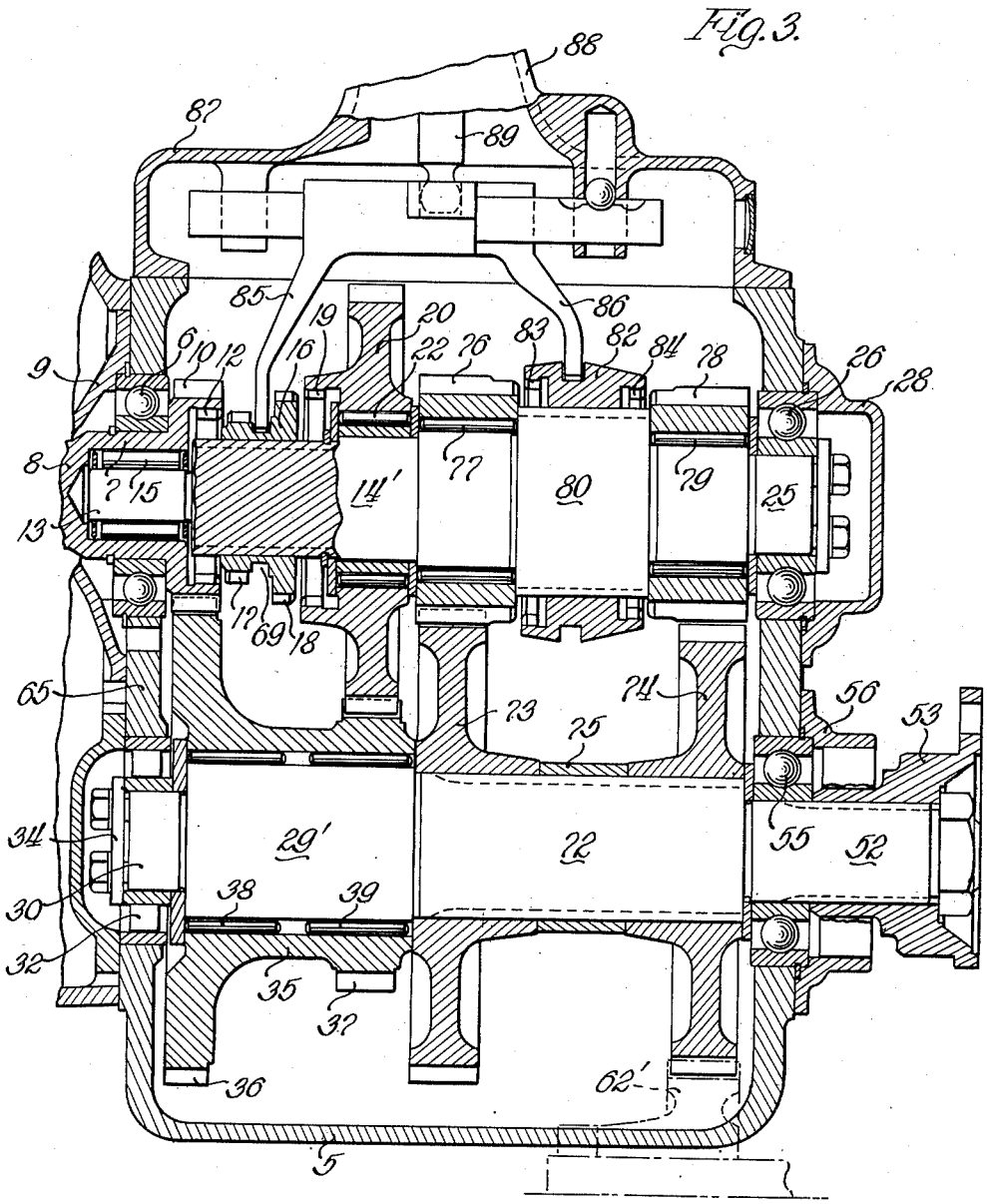
Figure 3 is a sectional view of a slightly modified form of transmission.

Referring in detail to Figure 3 which illustrates a transmission construction for industrial trucks which is slightly modified from that shown in Figures 1 and 2, the same reference numerals are employed to designate corresponding parts in this illustration.

In this form of the invention, the counter shaft 29' is provided with the compound rotatable gears 36 and 37 similar to those shown in Figure 1, but the reduced portion 72 of this shaft is splined to receive the non-rotatable gears 73 and 74 respectively, separated by the intermediate spacer 75. The gear 73 is adapted to have meshing engagement with a gear member 76 rotatably mounted as by means of the bearings 77 upon the input shaft 14'. The gear 74 is adapted to have meshing engagement with an idler gear 62' shown out of position, which in turn, meshes with the rotatable gear 78 mounted on the bearings 79 adjacent the reduced end 25 of the input shaft 14'. Intermediate the gears 76 and 78, the shaft 14' is provided with an enlarged splined portion 80 on which is mounted the axially shiftable clutch sleeve 82 having internal clutch teeth 83 and 84 at opposite ends thereof, adapted to have meshing engagement with clutch tooth portions formed on the adjacent ends of the gears 76 and 78. With this construction, it will be apparent that the shifting is all accomplished by the sliding clutches 16 and 82 mounted on the shaft 14', and no clutch sleeves are provided on the counter shaft 29'. Thus all of the gears carried by the input shaft 14' are rotatably mounted relative thereto and are selectively clutched to the shaft to provide the desired speed ratios and direction of drive. A suitable shifter fork 85 is provided for actuating the clutch 16 and a second shifter fork 86 is provided for actuating the clutch sleeve 82. These forks are carried upon opposite shift rails axially mounted in the covered member 87 secured to the top of the transmission housing 5 and carrying control towers 88 through which extend gear shift levers 89 selectively operable to actuate the shifter forks 85 and 86.

In the operation of the transmission shown in Figure 3, reverse drive is effected by shifting the clutch sleeve 82 to the right as viewed in Figure 3, thereby clutching gear 78 to shaft 14'. This, in turn, produces meshing engagement from gear 78 through the idler gear 62' to the gear 74 mounted on the output shaft 29'. With clutch sleeve 82 in this position, either low or high reverse drive is effected by selective actuation of clutch sleeve 16, low speed drive being effected by shifting the sleeve 16 to the right whereby the drive comes from the driving pinions 10 through the gear 35 and thence through gear 20 to shaft 14'. High speed reverse drive is effected by shifting the sleeve 16 to the left thereby coupling shaft 14' directly to the clutch shaft 8'. To produce forward drive, the clutch sleeve 82 is shifted to the left to clutch gear 76 to shaft 14' which in turn, produces a driving engagement from shaft 14' to shaft 29' through gears 76 and 73. Here again, either high or low speed drive can be effected by control of the clutch sleeve 16. Thus the operator is able to select either forward or reverse drive and either low or high speed operation in either direction of movement desired in the vehicle.

It is therefore believed apparent that I have provided a very compact and simplified two-speed forward and reverse type transmission, which is easily controlled by the operator for selection of both the speed of drive and the direction of drive, and which is compactly arranged to save as much space as possible which is a requisite for transmissions of the type used in industrial trucks and similar vehicles.

I am aware that various changes may be made in certain of the details of the construction herein shown and described, and I therefore do not intend to be limited except as defined by the scope and spirit of the appended claims.

I claim:
1. In a transmission, an input gear having internal and external teeth, a first countershaft piloted in said input gear and extending coaxially thereof, a first gear journaled on said first countershaft and spaced axially from said input gear, said first gear having internal and external teeth, a first clutch collar member keyed to said first countershaft between said input and first gears, said first clutch collar member having two sets of external teeth adapted to engage selectively with the internal teeth of said input and first gears, an output shaft spaced from said first countershaft, a compound gear journaled on said output shaft, and having meshing engagement with the external teeth of said input and first gears, a second gear journaled on said first countershaft adjacent said first gear, a third gear keyed to said output shaft adjacent said compound gear, said second gear having meshing engagement with said third gear, a fourth gear journaled on said first countershaft axially spaced from said second gear, a second countershaft, a fifth gear on said second countershaft, said fourth gear having meshing engagement with said fifth gear, a sixth gear keyed to said output shaft, said fifth gear having meshing engagement with said sixth gear, the facing ends of said second and fourth gears having reduced diameters for a short axial length, a second clutch collar member keyed to said countershaft between said second and fourth gears, and said second clutch collar member having two sets of internal teeth adapted to engage selectively with the reduced diameters of said second and fourth gears.

2. The transmission described in claim 1 characterized by the provision of a first radially extending shifter fork disposed between said input and first gears for effecting axial movement of said first clutch collar member, and a second radially extending shifter fork disposed between said second and fourth gears for effecting axial movement of said second clutch collar member.

ERNEST E. EATON.

REFERENCES CITED

The following references are of record in the file of this patent:

UNITED STATES PATENTS

| Number | Name | Date |
| --- | --- | --- |
| 1,417,950 | Smalley | May 30, 1922 |
| 1,795,018 | Foster | Mar. 3, 1931 |
| 1,909,242 | Wagner | May 16, 1933 |
| 1,987,006 | Foster | Jan. 8, 1935 |
| 2,220,541 | Peterson | Nov. 5, 1940 |

FOREIGN PATENTS

| Number | Country | Date |
| --- | --- | --- |
| 119,098 | Great Britain | Sept. 26, 1918 |
| 425,851 | Great Britain | Mar. 22, 1935 |
| 799,949 | France | Apr. 20, 1936 |